(12) United States Patent
Kim et al.

(10) Patent No.: US 7,746,599 B2
(45) Date of Patent: Jun. 29, 2010

(54) HARD DISK DRIVE APPARATUS AND METHOD WITH RAMP PARKING

(75) Inventors: Do-Wan Kim, Suwon-si (KR); Sung-Wook Kim, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 943 days.

(21) Appl. No.: 11/529,600

(22) Filed: Sep. 29, 2006

(65) Prior Publication Data

US 2007/0081273 A1     Apr. 12, 2007

(30) Foreign Application Priority Data

Oct. 7, 2005    (KR) ...................... 10-2005-0094241

(51) Int. Cl.
*G11B 5/54* (2006.01)
(52) U.S. Cl. ................................. 360/254.8; 360/254.7
(58) Field of Classification Search .............. 360/254.8, 360/254.7
See application file for complete search history.

(56) References Cited

U.S. PATENT DOCUMENTS

| 5,526,206 | A | * | 6/1996 | Shimizu | ................... | 360/254.8 |
|---|---|---|---|---|---|---|
| 6,067,209 | A | | 5/2000 | Aoyagi et al. | | |
| 6,292,333 | B1 | * | 9/2001 | Blumentritt et al. | ...... | 360/254.8 |
| 6,449,129 | B1 | * | 9/2002 | Macpherson et al. | ..... | 360/254.8 |
| 6,674,613 | B2 | * | 1/2004 | Arikawa et al. | .......... | 360/254.7 |
| 6,690,548 | B2 | * | 2/2004 | Koyanagi et al. | ......... | 360/254.8 |
| 7,110,221 | B2 | * | 9/2006 | Kuwajima et al. | ........ | 360/254.7 |
| 2005/0018353 | A1 | * | 1/2005 | Tsukahara | ............... | 360/254.8 |
| 2005/0057854 | A1 | | 3/2005 | Khanna et al. | | |
| 2006/0268462 | A1 | * | 11/2006 | Ohwe | ...................... | 360/254.8 |

FOREIGN PATENT DOCUMENTS

| JP | 2000-298964 | 10/2000 |
|---|---|---|
| JP | 2001-243735 | 9/2001 |
| JP | 2004-171674 | 6/2004 |

* cited by examiner

*Primary Examiner*—Jefferson Evans
(74) *Attorney, Agent, or Firm*—Staas & Halsey LLP

(57) ABSTRACT

A hard disk drive including an end tab extending from an end portion of a suspension that supports a read/write head, and a ramp including a plurality of end tab limiters and preventing the end tab from being separated, due to an external impact, from a parking zone where the end tab is supported, and at least one assembly guide rail inclined at a predetermined angle to form an assembly guide slope that guides movement of the end tab to the parking zone. At least one end tab limiter may be connected to at least one assembly guide rail and upper and/or lower sides of the end tab limiter forms with the assembly guide slope a movement guide path to guide the movement of the end tab to the parking zone.

20 Claims, 11 Drawing Sheets

HARD DISK DRIVE APPARATUS AND METHOD WITH RAMP PARKING

CROSS-REFERENCE TO RELATED APPLICATIONS

This application claims the priority benefit of Korean Patent Application No. 10-2005-0094241, filed on Oct. 7, 2005, in the Korean Intellectual Property Office, the disclosure of which is incorporated herein by reference.

BACKGROUND OF THE INVENTION

1. Field of the Invention

Embodiments of the present invention relate to a hard disk drive, and more particularly, to a hard disk drive and method parking a read/write head to minimize deformation of a ramp end tab, generated as the end tab bumps against a lateral surface of an end tab limiter when a head stack assembly (HSA) is assembled on a base while the end tab is located at an initial assembly position of the ramp.

2. Description of the Related Art

Hard disk drives (HDDs) are recording and reproducing apparatuses for writing/reading data to/from a disk using a read/write head. HDDs are presently widely being used as auxiliary storage devices for computer systems due to their ability to access a large amount of data at high speeds.

Recently, HDD capacities have been increasing with the increases in the number of tracks per inch (TPI) (representing a density of the hard disk in a disk radial direction) and the number of bits per inch (BPI) (representing a density of the hard disk in a disk rotational direction). With such increases in capacities, the available application range for HDDs also has been extended. Further, HDDs have also been shrinking in size for use in portable electronic devices, such as in notebook computers, personal digital assistants (PDAs), and mobile phones. For example, 2.5 inch HDDs have been developed for such notebook computers. Similarly, an ultra-compact HDD having a diameter of 0.85 inches, for example, similar to that of a coin, is actively under development for use in mobile phones.

HDDs typically include a disk for recording/reproducing data, a spindle motor to rotate the disk, and an actuator having a read/write head to record and/or reproduce data to/from the disk. The actuator can pivot around a pivot shaft, e.g., through a voice coil motor (VCM), and may further include an actuator arm rotatably coupled to the pivot shaft capable of pivoting, a slider on which the read/write head may be mounted, and a suspension installed at the actuator arm and supporting the slider for elastically biasing the read/write head over a surface of the disk. Here, the slider may be supported by the suspension by being attached to a flexure.

During the recording and/or reproduction of data, both the lift force generated by airflow formed by the rotation of the disk and an elastic force generated by the suspension act on the slider with the read/write head. Accordingly, the slider can maintain lifted above a data zone of the disk, at a height where the lift force and the elastic force are balanced. Thus, the read/write head mounted on the slider records and/or reproduces data to/from the disk while maintaining a particular gap with the rotating disk. When the rotation of the disk is stopped, e.g., when power is turned off, the lift force disappears. When the lift force disappears, the slider needs to be away from the data zone of the disk before the lift force disappears to prevent the slider from contacting and damaging the data zone. Accordingly, before the disk completely stops rotating, the actuator arm is caused to move, e.g., rotate, the slider to a parking zone, e.g., on the disk. Accordingly, even when the disk rotation is stopped, since the read/write head has been moved to the parking zone, such damage to the data zone can be prevented.

Therefore, when the disk rotation is stopped, e.g., when power to the hard disk drive is cut off, it is common for the read/write head mounted on the slider to be parked by moving the same to a parking zone on the disk, for example, before the rotation of disk is completely stopped.

Methods of parking the read/write head include a contact start stop (CSS) method and a ramp loading method. In the CSS method, a parking zone on the disk, where no data is recorded, is provided along the inner circumferential surface of the disk, and the read/write head can escape from data zones by moving to the inner circumferential surface of the disk and contacts the parking zone, where it can stay parked. However, according to the CSS method, since the parking zone needs to be provided along the inner circumferential surface of the disk, the available space for storing data is reduced. Also, when the HDD is not operating, that is, when the disk is not rotating, an external impact could be applied to the HDD causing read/write head to become separated from the disk, by the impact, and collide with a data zone of the disk. Because of this head slap phenomenon data on the disk and/or the read/write head may be damaged.

This head slap occurs when a considerable impact is applied to the HDD causing the read/write head to become separated from the disk and then collide with the disk either in the parking zone or a data zone on the surface of the disk. As a result, the disk surface may be damaged by the read/write head striking the disk surface. In addition, debris may also be scattered within the disk drive enclosure and across the surface of the disk. Although the debris may only be small enough to be observed using a microscope, since the hard disk drive is a high precision apparatus, if the debris is scattered in the data zone or interposed between the read/write head and the disk, the HDD can malfunction.

Thus, for the aforementioned portable HDDs, e.g., having diameters of 2.5 inches, 1 inch, or 0.85 inches, for example, for use in mobile environments, the ramp loading method may also be available, where the read/write head is separated from the disk and placed on a ramp structure adopted to minimize the amount of impact occurring when the HDD is not in use.

As described above, the ramp loading method parks the read/write head on a ramp installed outside of the disk. For example, FIG. 1 illustrates such a ramp where an end tab 120 portion of the suspension 114 moves to a parking zone of the ramp 130 to park the read/write head. As shown in FIG. 1, the end tab 120, upon moving into the parking zone and during the parking of the read/write head, becomes supported on a parking zone 136a on the ramp 130. Here, the ramp 130 includes a parking guide rail 135, forming a parking guide surface 136, to guide the movement of the suspension 114 when the corresponding read/write head is parked, a disk guide rail 139 located adjacent to the parking guide rail 135, an assembly guide rail 133, an end tab limiter 132 to prevent the end tab 120 from being separated from its location in the parking zone, e.g., by an external impact, and a third limiter 137 to prevent a flexure (not shown) from being separated from the parking zone, e.g., by the external impact. A predetermined section of the parking guide surface 136 is assigned to the parking zone 136a for the end tab 120.

In such a configured HDD, when the disk rotation is stopped, e.g., when the power of the HDD is turned off, a VCM (not shown) rotates the actuator arm 112, connected to a pivot shaft holder 113, clockwise. Accordingly, the end tab 120 portion of the suspension 114 contacts an inclined surface 139a of the disk guide rail 139 of the ramp 130. Next, the end tab 120 moves along the inclined surface 139a of the disk guide rail 139 and the parking guide surface 136 of the parking guide rail 135 to be placed in the parking zone 136a on the parking guide surface 136.

FIG. 2 illustrates a head stack assembly on a base where the end tab is placed at an initial assembly position of the ramp, e.g., such as in the HDD of FIG. 1. Referring to FIGS. 1 and 2, when a head stack assembly 110 is assembled on a base (not shown), for example, and while the end tab 120 is placed on the initial assembly position of the ramp 130, a shipping comb 150 may be applied to the suspension 114 to separate a plurality of end tabs, i.e., to increase the distance between each end tab so that the respective suspensions 114 are maintained at constant intervals. When the actuator arm 112 is rotated counterclockwise toward the assembly guide rail 133 to be inserted in an end portion of the ramp 130 at an inlet side thereof, the end tab 120 contacts the assembly guide slope 134, formed along an end of the assembly guide rail 133, and is guided from the assembly guide slope 134 to the parking zone 136a on the parking guide surface 136. The parking zone 136a is the initial assembly position, as an assembly position when product assembly is completed. Before the end tab 120, after moving along the assembly guide slope 134, arrives at the parking zone 136a, the shipping comb 150 may be removed by an external apparatus (not shown) in a direction indicated by the illustrated arrow shown in FIG. 2. The end tab 120 contacts the parking zone 136a on the parking guide surface 136 of the parking guide rail 135, which may be the initial assembly position. In this state, the head stack assembly 110 may be fixed through a coupling member to a base (not shown).

However, in the conventional HDD, when the head stack assembly is assembled on the base while the end tab is placed at the initial assembly position, due to various reasons such as the inappropriate aligning of the shipping comb with the suspension(s) or the head stack assembly being manufactured out of allowance, the end tab is moved to the parking zone through the entrance end portion of the ramp at an inappropriate position at which the end tab is inclined in a direction resulting in the end tab colliding with the lateral surface of the end tab limiter.

As described above, in the conventional HDD, due to various reasons such as the inappropriate insertion of the shipping comb in the suspension, when the head stack assembly is assembled on the base while the end tab is placed at the initial assembly position, the end tab may collide with the end tab limiter so that excessive torque is applied to the end tab resulting in the end tab and the flexure being deformed. Thus, the operation of the slider becomes unstable during the loading/unloading of the slider resulting in serious defects such as scratches, thermal asperity (TA), or head-media touch occurrences, which ultimately cause defects in the final product.

SUMMARY OF THE INVENTION

One aspect of the present invention provides a hard disk drive which can prevent ill effects on the loading/unloading characteristics of a slider due to the deformation of an end tab or flexure by remarkably reducing the potential of a collision between the end tab and an end tab limiter, which may occur when the head stack assembly (HSA) is assembled on a base while the end tab is placed at an initial assembly position of the ramp.

To achieve the above and/or other aspects and advantages, embodiments of the present invention include a hard disk drive to record and/or reproduce data, including a ramp including a ramp main body, a plurality of end tab limiters protruding from a side surface of the ramp main body to prevent an end tab of a suspension of the hard disk drive from being separated, due to an external impact, from a parking zone of the ramp, where the end tab is supported at the parking zone when a read/write head of the suspension is parked, and at least one assembly guide rail inclined at a predetermined angle and protruding from the side surface of the ramp main body to form an assembly guide slope to guide movement of the end tab to the parking zone from an assembly entry point, wherein at least one end tab limiter is connected to at least one assembly guide rail and an upper and/or lower side of the one end tab limiter forms with the assembly guide slope a continuous contact movement guide path to guide the movement of the end tab to the parking zone from the assembly point.

The hard disk drive may include the suspension, including the end tab extending from an end portion of the suspension, to support the read/write head.

The hard disk drive may further include at least one disk for storage of information.

The hard disk drive may include a head stack assembly to rotatably support the read/write head, the suspension, and a flexure coupled to the suspension and supporting the read/write head, to rotate across a disk of the hard disk drive around a predetermined pivot shaft, wherein the movement guide path is a continuous path from the assembly guide slope to an end of the one end tab limiter, along which the end tab is moved to the parking zone when the head stack assembly is assembled in the hard disk drive.

At least one parking guide rail may further be included, to protrude from the side surface of the ramp main body to form a parking guide surface to guide the movement of the end tab to/from where a disk of the hard drive would be accommodated and the parking zone. The hard disk drive may include at least one third limiter protruding heightwise from the side surface of the ramp main body adjacent to the parking guide surface, which faces the one end tab limiter, to prevent the flexure from moving without hindrance due to an external impact when the read/write head is parked.

The third limiter may protrude from the side surface of the one parking guide rail beyond a protrusion height of the one end tab limiter from the side surface of the ramp main body.

A horizontal length of the third limiter may be greater than that of the one end tab limiter.

In addition, the parking zone may be a predetermined section of the parking guide surface below the one end tab limiter, and the head stack assembly may be elastically biasable to allow the end tab to be located in the parking zone.

One side end of the one parking guide rail may be connected to the one assembly guide rail. Further, the one assembly guide rail, the one parking guide rail, and the one end tab limiter may have substantially the same protrusion height from the side surface of the ramp main body.

One side end of the one assembly guide rail may make surface contact with an entrance end portion of the ramp main body. In addition, a degree of inclination of the assembly guide slope may gradually increase from the entrance end portion of the ramp main body to the one end tab limiter.

The hard disk drive may include a disk guide rail protruding from the side surface of the ramp main body, connected to the one parking guide rail, to guide the end tab to the parking zone from a position where the outer end of the disk of the hard disk drive would be accommodated.

Tip ends of the disk guide rail may be inclined toward the position where the outer end of the disk of the hard disk drive would be accommodated.

In addition, one assembly guide rail, the one parking guide rail, and the one end tab limiter may have substantially the same protrusion height from the side surface of the ramp main body.

The ramp may further include a fixed portion coupled to the ramp main body to fix the ramp main body to a base of the hard disk drive.

The ramp may be formed of plastic through an injection molding method.

The side surface of the ramp main body on which the one end tab limiter is provided may have a curved shape corresponding to a curved direction in which the end tab would move.

In addition, the end tab may include a protrusion to reduce a contact area with the parking guide surface.

The parking guide surface may be provided along each of upper and/or lower sides of the one parking guide rail, the assembly guide slope may be provided along each of upper and/or lower sides of the one assembly guide rail, and two end tab limiters may be connected to the one assembly guide rail.

Each of the one parking guide rail, the one assembly guide rail, and the third limiter may be provided in pairs, with four corresponding end tab limiters.

The parking guide surface may be provided along each of upper and/or lower sides of the one parking guide rail, the assembly guide slope may be provided along each of upper and/or lower sides of the one assembly guide rail, and one of the end tab limiters may be connected to the one assembly guide rail and another one of the end tab limiters may be separated from the one assembly guide rail and located under the assembly guide slope.

The parking guide surface may be provided along each of upper and/or lower sides of the one parking guide rail, the assembly guide slope may be provided along each of upper and/or lower sides of the one assembly guide rail, with each of the one parking guide rail, the one assembly guide rail, and the third limiter being provided in pairs, two of the end tab limiters being connected to the one assembly guide rail, and another one of the end tab limiters being separated from the one assembly guide rail and located between a pair of the parking guide surfaces.

To achieve the above and/or other aspects and advantages, embodiments of the present invention include a recording and/or reproducing apparatus parking ramp, including an end tab limiter to prevent an end tab of a suspension of the recording and/or reproducing apparatus from being separated from a parking zone of the ramp, an assembly guide rail having an assembly entrance inclination at a predetermined angle to form an assembly guide slope to guide movement of the end tab to the parking zone from an assembly entry point through a continuous contact path to an end of the end tab limiter opposite the assembly entry point, and a parking guide rail to provide the parking zone and to provide a guide path for the end tab between the parking zone and a position where a medium of the recording and/or reproducing apparatus would be accommodated, through an entry point of the ramp different from the assembly entry point.

To achieve the above and/or other aspects and advantages, embodiments of the present invention include a recording and/or reproducing apparatus, including a suspension to support a read/write head for recording and/or reproducing data from a medium, and a recording and/or reproducing apparatus parking ramp according to an embodiment of the present invention.

The recording and/or reproducing apparatus may further include the medium to store data.

To achieve the above and/or other aspects and advantages, embodiments of the present invention include a recording and/or reproducing parking method, including moving an end tab of a suspension of a recording and/or reproducing apparatus through a continuous contact path in a ramp, from an assembly entry point of an assembly entrance inclination to an end of an end tab limiter, the end tab limiter preventing the end tab from being separated from a parking zone of the ramp adjacent to the end tab limiter.

To achieve the above and/or other aspects and advantages, embodiments of the present invention include a recording and/or reproducing parking method, including moving an end tab of a suspension of a recording and/or reproducing apparatus through a guide path of a ramp according to an embodiment of the present invention, between a parking zone and a position where a a medium of the recording and/or reproducing apparatus would be accommodated, through an entry point of the ramp different from an assembly entry point.

Additional aspects and/or advantages of the invention will be set forth in part in the description which follows and, in part, will be apparent from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF THE PREFERRED EMBODIMENTS

Figure 1:
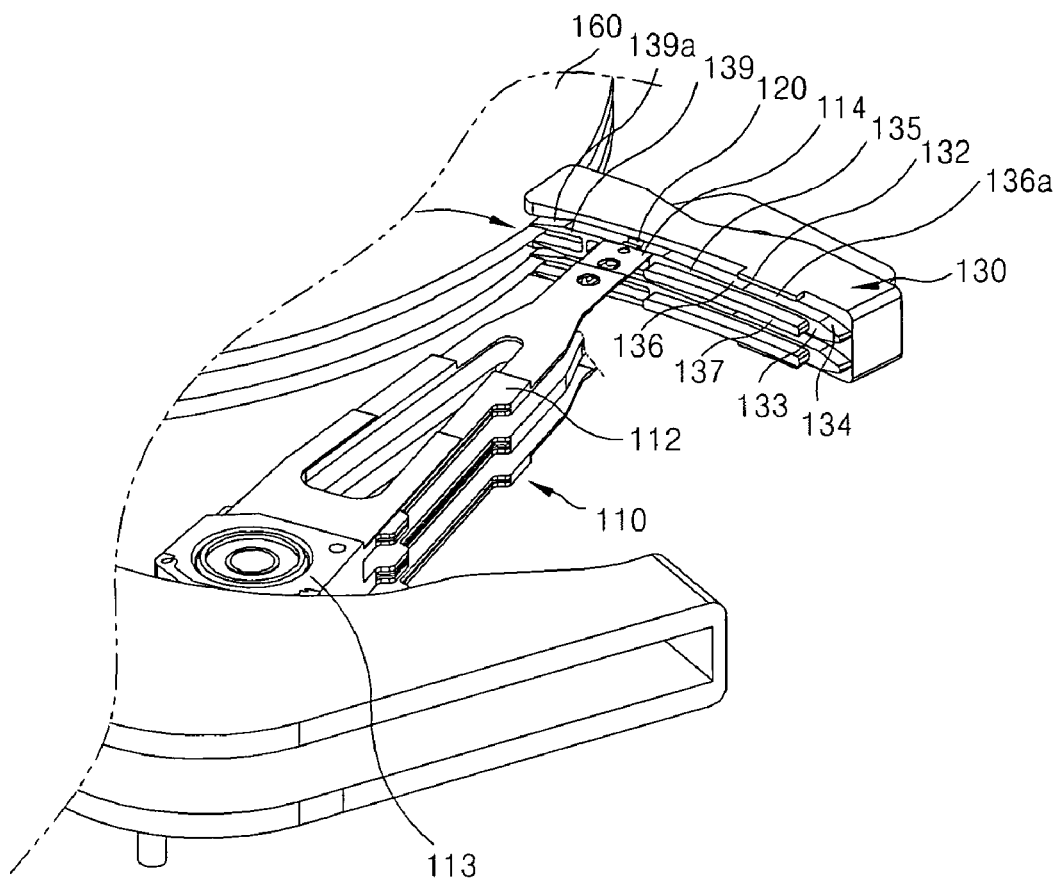
FIG. 1 illustrates a hard disk drive (HDD) having a suspension end tab portion that is moved to a parking zone of a ramp when the read/write head is parked in the conventional HDD.

Reference will now be made in detail to embodiments of the present invention, examples of which are illustrated in the accompanying drawings, wherein like reference numerals refer to the like elements throughout. Embodiments are described below in order to explain the present invention by referring to the figures.

Figure 3:
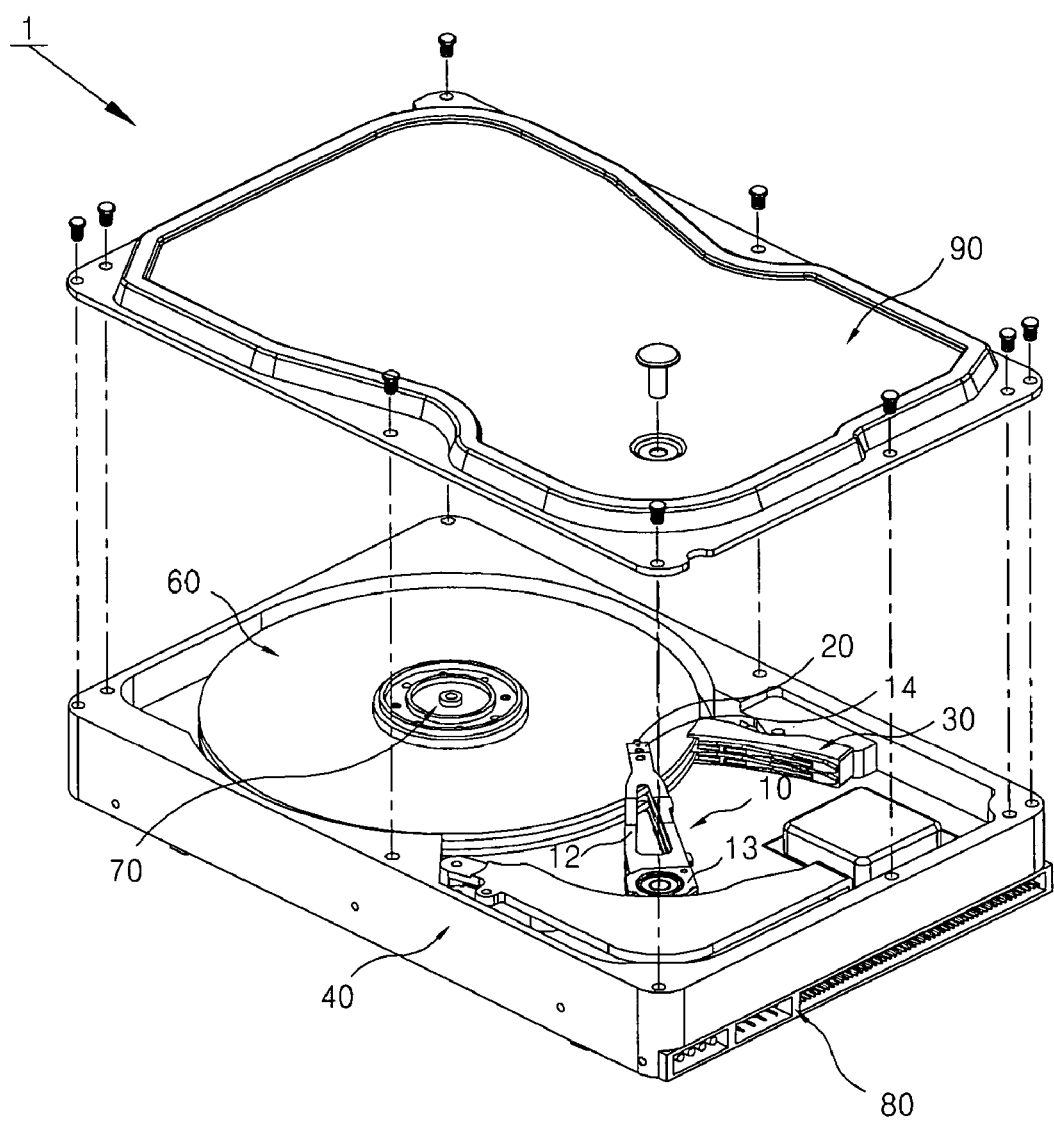
FIG. 3 illustrates a HDD according to an embodiment of the present invention.
Figure 4:
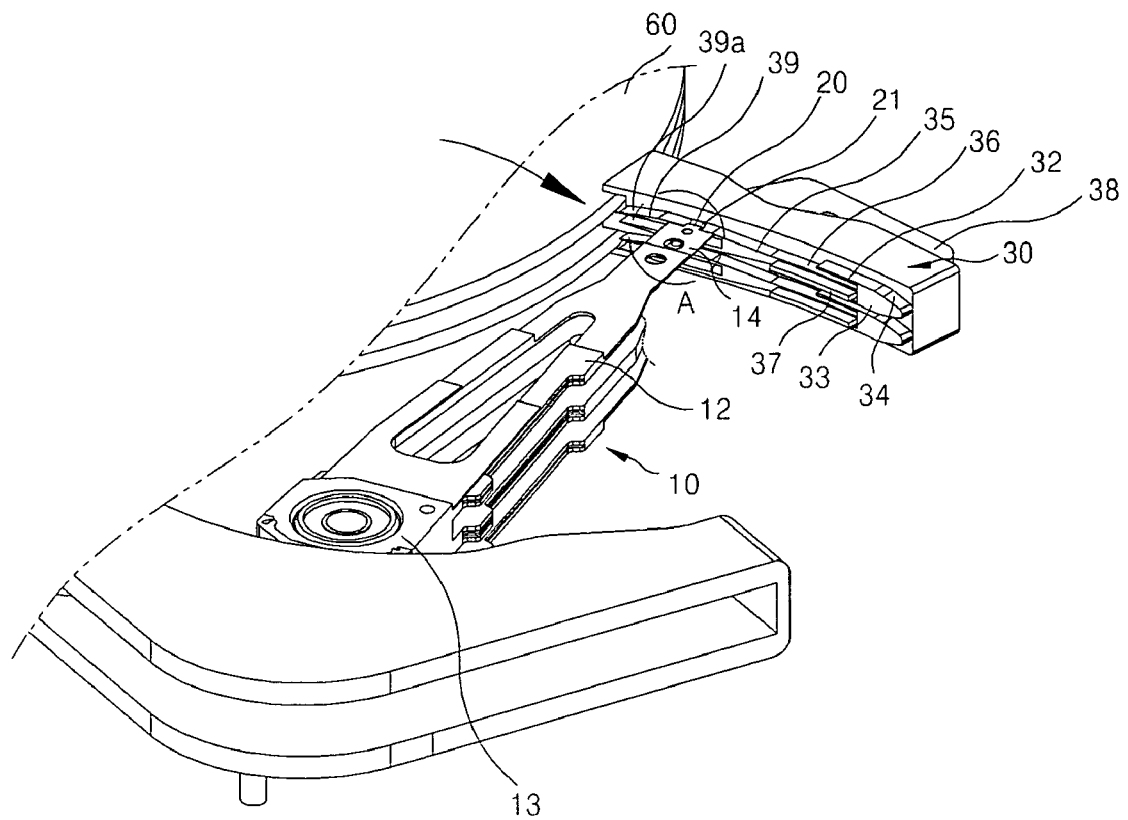
FIG. 4 illustrates a HDD having a suspension the end tab portion moving to a parking zone of a ramp when a read/write head of the HDD is parked.
Figure 5:
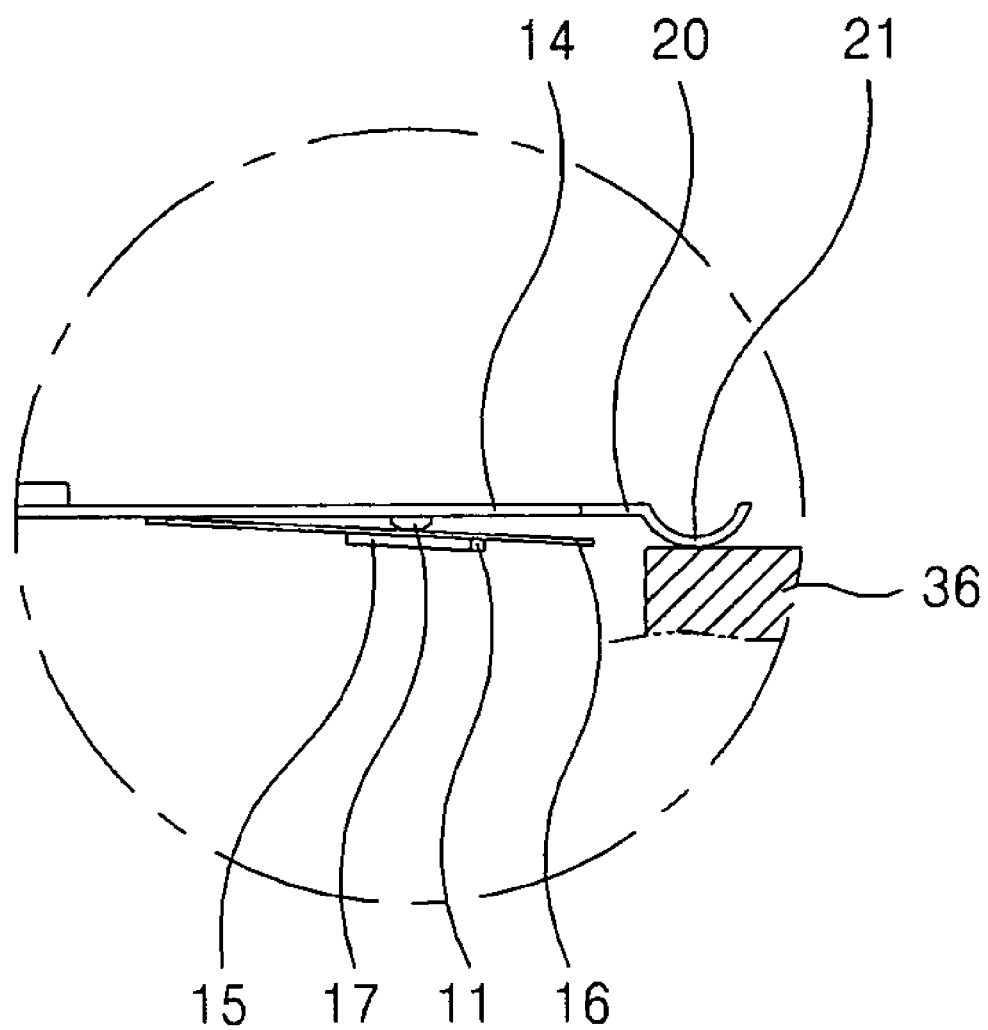
FIG. 5 is a cross-sectional for illustrated portion "A" of FIG. 4.

Referring to FIGS. 3, 4, and 5, a hard disk drive 1, according to an embodiment of the present invention includes a disk 60 for recording and storing data, a spindle motor 70 for rotating the disk 60, a head stack assembly (HSA) 10 having a read/write head 11 for reading and/or recording data from/to the disk 60 while rotating across the disk 60 around a predetermined pivot shaft, a ramp 30 on which the read/write head 11 is supported when the read/write head 11 is parked, e.g., when the rotation of the disk 60 is stopped, a printed circuit board assembly (PCBA) 80, which may include a printed circuit board (PCB) (not shown) on which most circuit parts may installed, for example, for controlling the above-described parts, a base 40 on which the above parts may be assembled, and a cover 90 to cover the upper part of the base 40.

The HSA 10 is a carriage enabling the recording and/or reproducing data to/from the disk 60 and includes the read/write head 11, an actuator arm 12 rotating across the disk 60 around a predetermined pivot shaft (not shown), permitting the read/write head 11 access to the data areas of the disk 60, a pivot shaft holder 13 rotatably supporting the pivot shaft and supporting the actuator arm 12 that is coupled thereto, and a bobbin (not shown) having a voice coil motor (VCM) coil (not shown) wound therearound and extending from the pivot shaft holder 13 in the opposite direction to the actuator arm 12 to be located between magnets (not shown) of a VCM (not shown).

The actuator arm 12 may include a suspension 14, installed along an end thereof, supporting the slider 15 (as shown in FIG. 5) and the corresponding read/write head 11 to be elastically biased toward the surface of the disk 60. The suspension 14 further includes an end tab 20 extending from an end portion of the suspension 14. A protrusion 21 is formed at an end portion of the end tab 20 to reduce the contact area with the ramp 30. As illustrated in FIG. 5, the slider 15 is generally supported by the suspension 14 by being attached to a flexure 16. A dimple 17 can be formed on the suspension 14 to protrude toward the flexure 16 to provide a predetermined elastic force to the flexure 16.

The VCM is a drive motor for pivoting the actuator arm 12 to move the read/write head 11 over a desired position on the disk 60, according to the Fleming's left hand rule, that is, the force generated when current is applied to a conductive body located in a magnetic field. As current is applied to the VCM coil, located between magnets, a pivoting force is generated and applied to the bobbin. Thus, as the actuator arm 12, extending from the pivot shaft holder 13 in an opposite direction as the bobbin, pivots, the read/write head 11 supported at the end portion of the actuator arm 12 moves across a rotating disk 60, e.g., to search tracks and access desired information.

Figure 6:
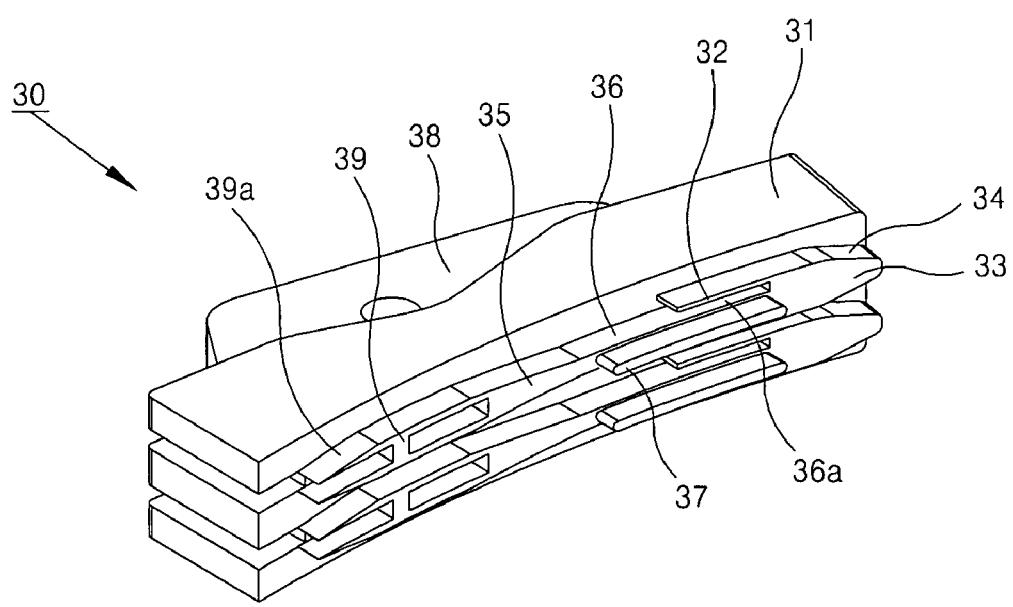
FIG. 6 illustrates a ramp for a HDD, such as the HDD of FIG. 3, according to an embodiment of the present invention.

Meanwhile, as shown in FIG. 4, when it is desired to withdrawal the read/write head 11 from being over the disk 60, e.g., when the rotation of the disk 60 is stopped as the power is turned off, the suspension 14 is rotated such that the corresponding end tab 20 is placed on the ramp 30, thereby parking the read/write head 11 in a predetermined parking zone 36a (as shown in FIG. 6). Accordingly, the end tab 20 is moved from being over the disk 60 and placed in the parking zone 36a of the ramp 30. However, through the placement of the end tab 20, the read/write head 11 is correspondingly parked on the ramp 30 and if an external impact or vibration is then applied to the hard disk drive 1 the actuator arm 12 could be rotated so that the read/write head 11 becomes separated from the ramp 30 and moved over a recording surface of the disk 60. In this case, the read/write head 11 would contact the recording surface of the disk 60 so that the read/write head 11 and the recording surface of the disk 60 would be damaged. Thus, according to an embodiment of the present invention, there may be a need to lock the actuator arm 12 at a predetermined position so as not to move from a state in which the read/write head 11 is parked in the parking zone 36a of the ramp 30, e.g., as the rotation of the disk 60 is stopped. For this purpose, an actuator latch (not shown) may be provided. That is, the actuator latch may elastically bias the HSA 10 so that the end tab 20 remains located in the parking zone 36a when the read/write head 11 is parked.

FIG. 6 illustrates a ramp, such as that of the HDD of FIG. 3. Referring to FIG. 6, the ramp 30 may be formed of plastic, e.g., in an injection molding method, and may include a ramp main body 31, an end tab limiter 32, an assembly guide rail 33, a parking guide rail 35, a third limiter 37, a disk guide rail 39, and a fixed portion 38. The end tab limiter 32, the assembly guide rail 33, the parking guide rail 35, and the third limiter 37 protrude from a lateral surface of the ramp main body 31 and may be integrally coupled to the ramp main body 31. As only an example, the fixed portion 38 may be coupled to an opposite side of the lateral surface of the ramp main body 31 as the end tab limiter 32 is coupled. According to an embodiment of the present invention, the fixed portion 38 fixes the ramp 30 to the base 40. The lateral surface of the ramp main body 31, where the end tab limiter 32 is provided, may further have a curved shape corresponding to the angular movement direction of the end tab 20.

Figure 2:
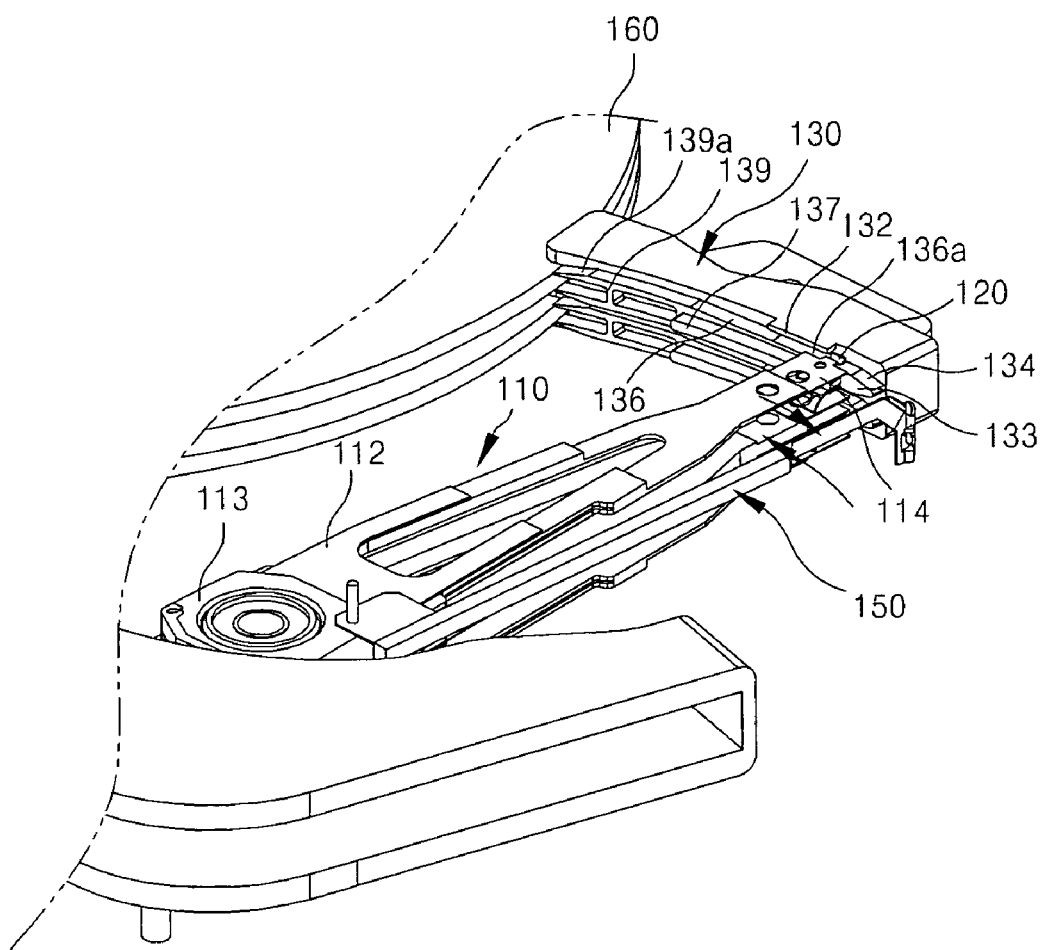
FIG. 2 illustrates a head stack assembly on a base, during an assembly, when the end tab is moved to an initial assembly position of the ramp in the HDD of FIG. 1.

Here, the end tab limiter 32 protrudes from the lateral surface of the ramp main body 31 to interact with the end tab 20 to thereby prevent the corresponding suspension 14 and read/write head 11 from moving, e.g., by an external impact, from the parking zone 36a. The assembly guide rail 33 can protrude from a lateral surface of the ramp main body 31, with an end portion inclined at a predetermined angle to form the assembly guide slope 34 for guiding the end tab 20 along the assembly guide rail 33 toward the parking zone 36a. The end tab limiter 32 can be connected to the ramp adjacent to the assembly guide rail 33, as illustrated in FIG. 6, such that a top surface of the end tab limiter 32 aligns with the assembly guide slope 34. Thus, a continuous movement guide path can be formed for moving end tab 20 to the parking zone 36a, e.g., for when the HSA 10 is assembled on the base 40. In this embodiment of the present invention, the continuous path corresponds to the inclination of a tangent line across the movement path being continuous, that is, a gently curved section is formed without a step. Accordingly, the end tab 20 can smoothly move along the movement guide path without the potential of being damaged through undesirable contact with portions of the ramp, e.g., the end tab limiter 132 of FIGS. 1 and 2, while progressing to the parking zone 36a. Thus, this conventional problem of the read/write head 11 and/or end tab 20 colliding with the end tab limiter 32, with excessive torque being applied to the end tab 20 during assembly, for example, resulting in the end tab 20 and the flexure 16 being deformed and the corresponding load/unload characteristic of the slider 15 being ill effected, can be prevented. Further, since such product defects generated during assembly can be prevented, manufacturing costs can be reduced and the overall quality of a product can be improved.

Similarly, the parking guide rail 35 can protrude from the lateral surface of the ramp main body 31 to form the parking guide surface 36 that can guide the end tab 20 from the disk 60 to the parking zone 36a, e.g., when the rotation of the disk 60 is stopped. The third limiter 37 may relatively further protrude from the lateral surface of the parking guide rail 35, for example, in a similar direction as the end tab limiter 32 protrudes, to face a lower surface, for example, of the end tab limiter 32. In the illustrated embodiment in FIG. 6, the identified third limiter 37 thus may be oriented directly below the flexure 16. Thus, when the read/write head 11 is parked and the end tab 20 is caused to move, e.g., by an external impact, away from the third limiter 37 and the parking guide surface 36, respectively, the end tab limiter 32 can collide with the end tab 20. When an external impact is applied so that the suspension 14 is deformed in direction away from the end tab limiter 32, the flexure 16, thus, may collide with the third limiter 37, thereby restricting movement of the flexure 16, and correspondingly, the read/write head 11. Here, impacts within general ranges, generated due to the collision of the flexure 16 and the third limiter 37 may be absorbed by the elasticity of the suspension 14. For example, the dimple 17 may be formed on the suspension 14 to protrude toward the flexure 16 to provide elasticity to the flexure 16 to absorb the impact.

The horizontal length of the third limiter 37 may be greater than the horizontal length of the end tab limiter 32.

In this embodiment, one end of the parking guide rail 35 may connect with an end of the assembly guide rail 33. Also, according to an embodiment of the present invention, the assembly guide rail 33, the parking guide rail 35, and the end tab limiter 32 may be formed to have substantially the same protruding height from the lateral side surface of the ramp main body 31. One end portion of the assembly guide rail 33 may make contact with an assembly entrance end portion of the ramp main body 31, with the assembly guide slope 34 being formed such that a degree of inclination gradually increases, for example, from the entrance end portion of the ramp main body 31 to the end tab limiter 32. As the inclination degree can be low at the entrance end portion of the ramp main body 31, the end tab 20 can thus enter the ramp 30 with the minimum impact during assembly of the suspension 14 with the ramp 30.

The disk guide rail 39 may protrude from the lateral surface of the ramp main body 31 and connect with another end of the parking guide rail 35, providing a guide for movement of the suspension 14 and corresponding end tab 20 away from the disk 60 and into the ramp 30. Thus, when the ramp 30 is coupled to the base 40, for example, part of the outer circumferential side of the disk 60 may be arranged for easy insertion of the end tab 20 onto the disk guide rail 39. The entrance tip end of the disk guide rail 39 may have an inclined surface 39a, e.g., inclined toward the disk 60. In addition, the disk guide rail 39, the assembly guide rail 33, the parking guide rail 35, and the end tab limiter 32 may have substantially the same height from the lateral side surface of the ramp main body 31.

In the hard disk drive 1 of a full population version, i.e., according to an embodiment where at least two disks 60 with corresponding suspensions 14, e.g., with four read/write heads 11, parking guide surfaces 36 may be provided along each of both of upper and/or lower sides of the parking guide rails 35 and the assembly guide slopes 34 may be provided along each of both of upper and/or lower sides of the assembly guide rails 33. Here, two end tab limiters 32 may be connected to each of the assembly guide rails 33. As a whole, the parking guide rails 35, the assembly guide rails 33, and the third limiters 37 may similarly be provided in pairs, with potentially four end tab limiters 32, for example. However, when there is only one disk 60 and potentially two read/write heads 11, e.g., in a hard disk drive of a depopulation version, there may be a need for only a single parking guide rail 35, assembly guide rail 33, and third limiter 37. Here, a parking guide surface 36 may be provided along each of upper and/or lower sides of the parking guide rail 35 while the assembly guide slope 34 may be provided along each of upper and/or lower sides of the assembly guide rail 33. With this embodiment, there may also only be two end tab limiters 32.

Figure 7:
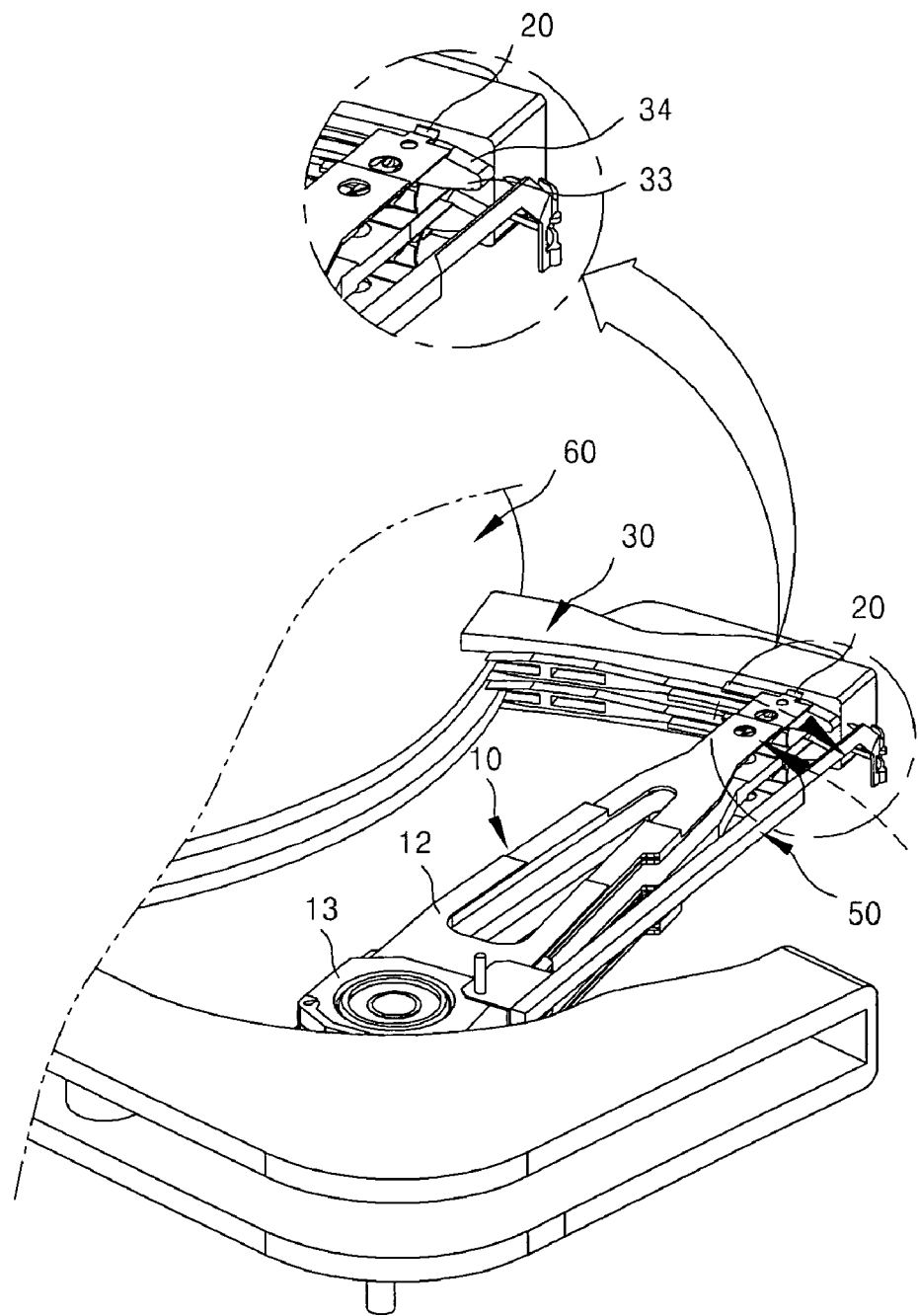
FIG. 7 illustrates a HDD with a head stack assembly during an assembling on a base while an end tab is placed in an initial assembly position of a ramp in a HDD, such as the HDD of FIG. 3, according to an embodiment of the present invention.
Figure 8:
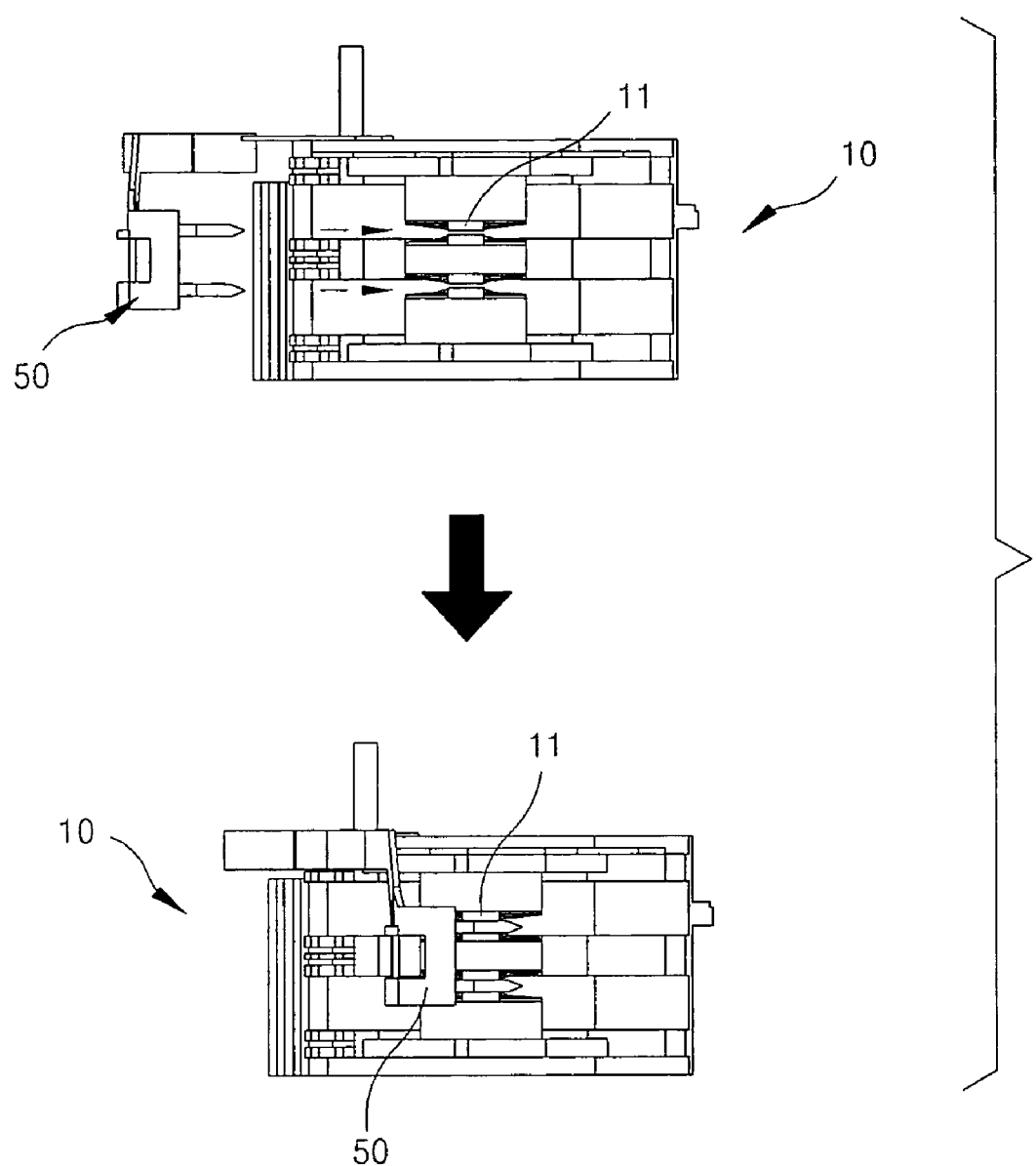
FIG. 8 illustrates a plurality of end tabs being separated from each other when the shipping comb is applied to a suspension(s)
Figure 9:
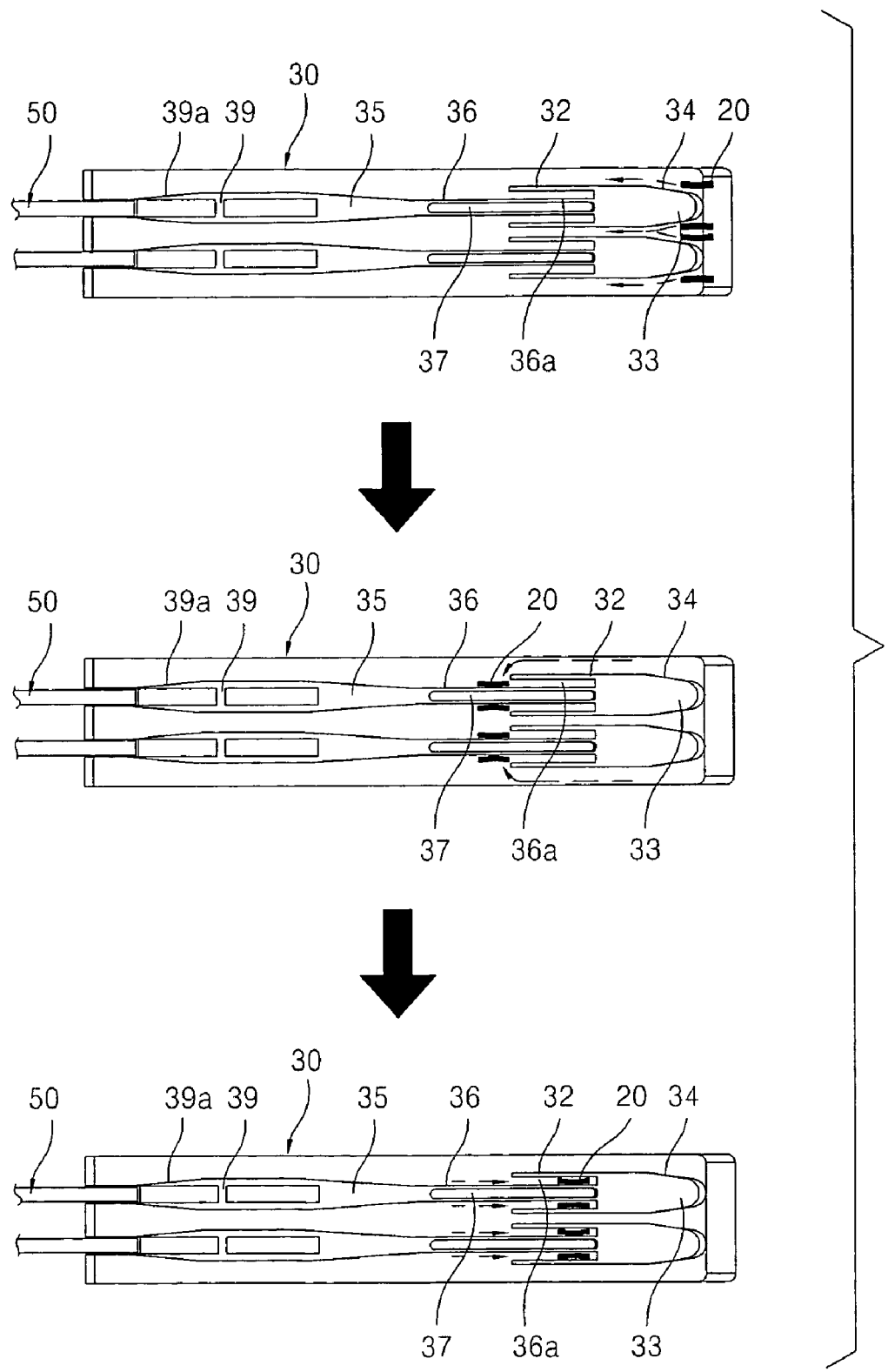
FIG. 9 illustrates a path of the end tab when the head stack assembly is assembled, with the end tab being moved to the initial assembly position of a ramp of a HDD, such as the HDD of FIG. 3, according to an embodiment of the present invention.

FIG. 7 illustrates a HDD with a head stack assembly being assembled on the base while the end tab is placed at the initial assembly position of a ramp, such as for the HDD of FIG. 3. FIG. 8 illustrates a plurality of end tabs being separated from each other when a shipping comb is inserted in the suspension, according to an embodiment of the present invention. FIG. 9 illustrates a path of the end tab when the head stack assembly is being assembled with the end tab being placed at the initial assembly position of a ramp, such as in the HDD of FIG. 3. As shown in FIGS. 7, 8, and 9, when the HSA 10 is assembled on the base 40, a shipping comb 50 may be aligned with the suspensions 14 to separate the end tabs 20. In this state, the actuator arm 12 can be rotated counterclockwise, for example, toward the assembly guide rail 33 to insert the respective end tabs 20 onto the entrance end portion of the ramp main body 31. Then, as shown in FIG. 9, the end tab 20 can contact the inclined assembly guide slope 34 of the assembly guide rail 33 and smoothly move along the continuous movement guide path from the assembly guide slope 34 to the outer upper, for example, surface of the corresponding end tab limiter 32.

When the end tab 20 moves along the assembly guide slope 34 and reaches a certain step, as shown in FIG. 7, the shipping comb 50 may be removed, e.g., by an external apparatus (not shown). When the shipping comb 50 is removed, the end tab 20 may then be moved while pressing the assembly guide slope 34 with a particular elastic force. According to an embodiment of the present invention, when arriving at the end tab limiter 32, as shown in FIG. 9, the end tab 20 may then be separated from the above mentioned end upper portion of the end tab limiter 32 and be made to contact the correspondingly below parking guide surface 36 of the parking guide rail 35, e.g., by the elastic restoration force of the suspension 14. Thereafter, the actuator arm 12, elastically biased toward the parking zone 36a, may be moved counterclockwise, for example, by the actuator latch (not shown) to the parking zone 36a, which can be considered initial assembly position.

Since the end tab limiter 32 and the assembly guide rail 33 are connected to each other, the assembly guide slope 34 and the outer upper surface (as illustrated) of the end tab limiter 32 form the continuous movement guide path, even when a shipping comb 50 is not inserted properly or manufactured out of allowance, that is, leaving open the possibility of an unstable situation. Accordingly, according to an embodiment of the present invention, the end tab 20 can arrive at the parking zone 36a without colliding against the end tab limiter 32, i.e., the potential of such an unstable situation is avoided. Also, since the collision between the flexure 16 and the third limiter 37 is minimized, deformation or damage of the end tab 20 and the flexure 16 can equally be minimized. Accordingly, the operation of the slider 15 is more stable during the loading/unloading of the slider 15 compared to the conventional technology. Thus, with embodiments of the present invention, serious defects such as scratches, thermal asperity (TA) or head-media collisions are avoided.

When assembly of the hard disk drive 1 is completed, the actuator arm 12 rotates clockwise or counterclockwise by the voice coil motor. As illustrated in FIG. 3, the voice coil motor rotates the actuator arm 12 counterclockwise to move the read/write head 11 to the recording surface of the disk 60, e.g., when the power of the hard disk drive 1 is turned on. As another example, when the power of the hard disk drive 1 is turned off and the rotation of the disk 60 is stopped, the voice coil motor may rotate the actuator arm 12 clockwise to move the read/write head 11 to the ramp 30 so that the read/write head 11 can be parked in the parking zone 36a. Thus, when such a ramp loading type parking method is adopted, a hard disk drive, according to an embodiment of the present invention, is designed to endure an impact of about 1000 G (Gauss; the unit of gravity). Conversely, with the conventional CSS method, the hard disk drive is designed to endure an impact of about 300 G, evidencing that the impact resistance of the ramp loading type parking method is remarkably superior to the CSS method.

Figure 10:
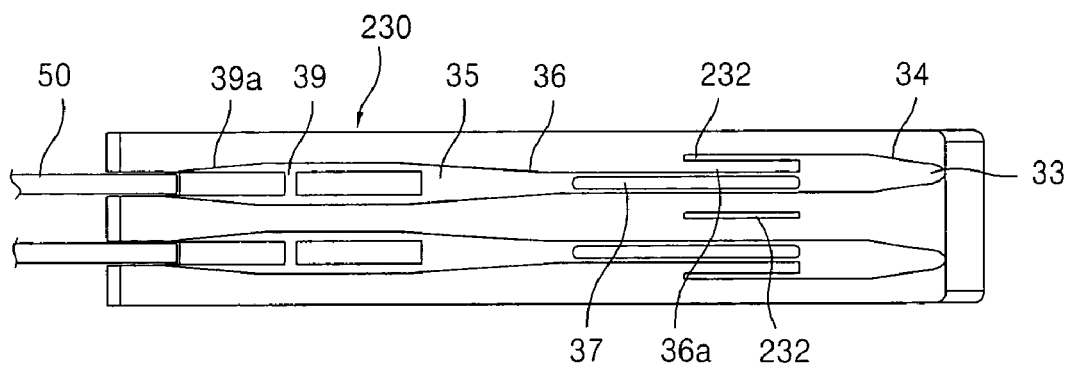
FIG. 10 illustrates a ramp of an HDD according to another embodiment of the present invention.

FIG. 10 illustrates a ramp of a HDD according to another embodiment of the present invention. In the following description, only different portions from an above embodiment will be described while the same reference numerals as those used in the description of the previous embodiment will be used for the same constituent elements having the same functions.

In a ramp 230 of a hard disk drive, according to another embodiment of the present invention, the parking guide surface 36 may be provided along each of upper and/or lower sides of the parking guide rail 35, the assembly guide slope 34 may be provided along each of upper and/or lower sides of the assembly guide rail 33, with one of end tab limiters 232 being connected to the assembly guide rail 33, and another one of the end tab limiters 232 being separated from the assembly guide rail 33 and located under the assembly guide rail 34. This structure can be applied to the hard disk drive of a depopulation version, for example. For the hard disk drive of a full population version, as shown in FIG. 10, there may be multiple parking guide rails 35, assembly guide rails 33, and third limiters 37. Here, with an embodiment with paired parking guide rails 35 and assembly guide rails 33 and two third limiter 37, each of two end tab limiters 232 may be connected to the assembly guide rail 33, and one end tab limiter 232 may be separated from the assembly guide rail 33 and located between a pair of the parking guide rails 35. Compared to the other embodiments, this structure is advantageous in that space, that is, the height of the ramp 230 may be reduced.

Figure 11:
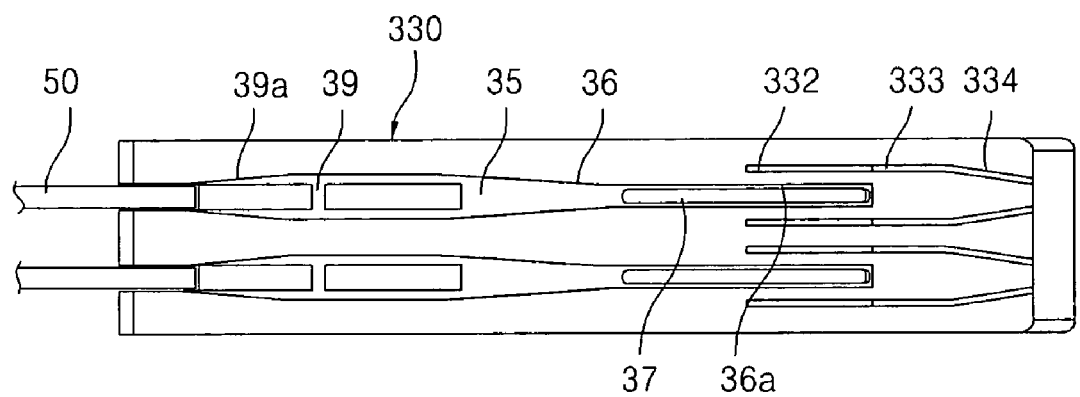
FIG. 11 illustrates a ramp of an HDD according to yet another embodiment of the present invention.

FIG. 11 illustrates a HDD, according to yet another embodiment of the present invention. In the following description, only different portions from an above embodiment will be described while the same reference numerals as those used in the description of the first previous embodiment will be used for the same constituent elements having the same functions.

Referring to FIG. 11, in a ramp 330 the assembly guide rail 333 may be connected to the end tab limiter 332 such that collision of the end tab 20 and the end tab limiter 332 is minimized, with the assembly guide rail 333 and the parking guide rail 35 being separated.

In above discussed embodiments, a third limiter protrudes higher than the end tab limiter as it protrudes from the side surface of the assembly guide rail. However, the third limiter may protrude farther than the end tab limiter as it protrudes from the side surface of the ramp main body.

As described above, a hard disk drive according to the present invention can prevent ill effects on the loading/unloading characteristic of the slider due to a deformation of an end tab or flexure by remarkably reducing collisions between the end tab and the end tab limiter of the hard disk drive, e.g., which may occur when the head stack assembly is assembled on the base while the end tab is placed at the initial assembly position of the ramp. Also, product defects generated during such an assembly operation can be so that the manufacturing costs can be reduced and the quality of resultant products can be improved.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A hard disk drive to record and/or reproduce data comprising:
   a ramp comprising a ramp main body, a plurality of end tab limiters protruding from a side surface of the ramp main body to prevent an end tab of a suspension of the hard disk drive from being separated, due to an external impact, from a parking zone of the ramp, where the end tab is supported at the parking zone when a read/write head of the suspension is parked, and at least one assembly guide rail inclined at a predetermined angle and protruding from the side surface of the ramp main body to form an assembly guide slope to guide movement of the end tab to the parking zone from an assembly entry point,
   wherein at least one end tab limiter is connected to at least one assembly guide rail and an upper and/or lower side of the one end tab limiter forms with the assembly guide slope a continuous contact movement guide path to guide the movement of the end tab to the parking zone from the assembly point;
   a head stack assembly to rotatably support the read/write head, the suspension, and a flexure coupled to the suspension and supporting the read/write head, to rotate across a disk of the hard disk drive around a predetermined pivot shaft,
   wherein the movement guide path is a continuous path from the assembly guide slope to an end of the one end tab limiter, along which the end tab is moved to the parking zone when the head stack assembly is assembled in the hard disk drive;
   at least one parking guide rail that protrudes from the side surface of the ramp main body to form a parking guide surface to guide the movement of the end tab to/from where a disk of the hard drive would be accommodated and the parking zone; and
   at least one third limiter protruding heightwise from the side surface of the ramp main body adjacent to the parking guide surface, which faces the one end tab limiter, to prevent the flexure from moving without hindrance due to an external impact when the read/write head is parked,
   wherein the third limiter protrudes from the side surface of the one parking guide rail beyond a protrusion height of the one end tab limiter from the side surface of the ramp main body.

2. The hard disk drive of claim 1, further comprising the suspension, comprising the end tab extending from an end portion of the suspension, to support the read/write head.

3. The hard disk drive of claim 2, further comprising at least one disk for storage of information.

4. The hard disk drive of claim 1, wherein a horizontal length of the third limiter is greater than that of the one end tab limiter.

5. The hard disk drive of claim 1, wherein the parking zone is a predetermined section of the parking guide surface below the one end tab limiter, and the head stack assembly is elastically biasable to allow the end tab to be located in the parking zone.

6. The hard disk drive of claim 1, wherein one side end of the one parking guide rail is connected to the one assembly guide rail.

7. The hard disk drive of claim 6, wherein the one assembly guide rail, the one parking guide rail, and the one end tab limiter have substantially the same protrusion height from the side surface of the ramp main body.

8. The hard disk drive of claim 6, further comprising a disk guide rail protruding from the side surface of the ramp main body, connected to the one parking guide rail, to guide the end tab to the parking zone from a position where the outer end of the disk of the hard disk drive would be accommodated.

9. The hard disk drive of claim 8, wherein tip ends of the disk guide rail are inclined toward the position where the outer end of the disk of the hard disk drive would be accommodated.

10. The hard disk drive of claim 9, wherein the one assembly guide rail, the one parking guide rail, and the one end tab limiter have substantially the same protrusion height from the side surface of the ramp main body.

11. The hard disk drive of claim 1, wherein one side end of the one assembly guide rail makes surface contact with an entrance end portion of the ramp main body.

12. The hard disk drive of claim 11, wherein a degree of inclination of the assembly guide slope gradually increases toward the one end tab limiter.

13. The hard disk drive of claim 1, wherein the ramp further comprises a fixed portion coupled to the ramp main body to fix the ramp main body to a base of the hard disk drive.

14. The hard disk drive of claim 13, wherein the ramp is formed of plastic through an injection molding method.

15. The hard disk drive of claim 1, wherein the side surface of the ramp main body on which the one end tab limiter is provided has a curved shape corresponding to a curved direction in which the end tab would move.

16. The hard disk drive of claim 1, wherein the end tab comprises a protrusion to reduce a contact area with the parking guide surface.

17. The hard disk drive of claim 1, wherein the parking guide surface is provided along each of upper and/or lower sides of the one parking guide rail, the assembly guide slope is provided along each of upper and/or lower sides of the one assembly guide rail, and two end tab limiters are connected to the one assembly guide rail.

18. The hard disk drive of claim 17, wherein each of the one parking guide rail, the one assembly guide rail, and the third limiter are provided in pairs, with four corresponding end tab limiters.

19. The hard disk drive of claim 1, wherein the parking guide surface is provided along each of upper and/or lower sides of the one parking guide rail, the assembly guide slope is provided along each of upper and/or lower sides of the one assembly guide rail, and one of the end tab limiters is connected to the one assembly guide rail and another one of the end tab limiters is separated from the one assembly guide rail and located under the assembly guide slope.

20. The hard disk drive of claim 1, wherein the parking guide surface is provided along each of upper and/or lower sides of the one parking guide rail, the assembly guide slope is provided along each of upper and/or lower sides of the one assembly guide rail, with each of the one parking guide rail, the one assembly guide rail, and the third limiter being provided in pairs, two of the end tab limiters being connected to the one assembly guide rail, and another one of the end tab limiters being separated from the one assembly guide rail and located between a pair of the parking guide surfaces.

* * * * *